(12) United States Patent
Lu

(10) Patent No.: US 7,949,379 B2
(45) Date of Patent: May 24, 2011

(54) FOLDABLE ELECTRONIC DEVICE

(75) Inventor: Chi-Chung Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 654 days.

(21) Appl. No.: 11/964,873

(22) Filed: Dec. 27, 2007

(65) Prior Publication Data

US 2009/0124307 A1 May 14, 2009

(30) Foreign Application Priority Data

Nov. 9, 2007 (CN) .......................... 2007 1 0202444

(51) Int. Cl.
H04M 1/00 (2006.01)
(52) U.S. Cl. .................................. 455/575.3; 455/575.1
(58) Field of Classification Search .................. 455/90.3, 455/575.1, 575.3, 575.5
See application file for complete search history.

(56) References Cited

U.S. PATENT DOCUMENTS

| 2005/0130720 A1* | 6/2005 | Finke-Anlauff | 455/575.3 |
| 2005/0282595 A1* | 12/2005 | Spence et al. | 455/575.3 |
| 2006/0195820 A1* | 8/2006 | Curtis et al. | 717/120 |
| 2009/0039546 A1* | 2/2009 | Honma | 264/241 |

FOREIGN PATENT DOCUMENTS

| CN | 1441611 A | 9/2003 |
| CN | 1973524 A | 5/2007 |

* cited by examiner

Primary Examiner — Nghi H Ly
Assistant Examiner — Myron Wyche
(74) Attorney, Agent, or Firm — Jeffrey T. Knapp

(57) ABSTRACT

A foldable electronic device (100) includes a cover (10) having a side barrel (132) and a main body (20) rotatably connected to the cover. The main body includes a body shell (21) accommodating a plurality of electronic components therein, a central barrel (244) formed at one end of the body shell, and an antenna seat (23) attached to an opposite end of the body shell. The side barrel of the cover is located adjacent to the central barrel of the main body.

19 Claims, 7 Drawing Sheets

FOLDABLE ELECTRONIC DEVICE

BACKGROUND OF THE INVENTION

1. Field of the Invention

The present invention generally relates to foldable electronic devices, such as foldable mobile phones and electronic notebooks.

2. Description of Related Art

With the development of wireless communication and information processing technologies, portable electronic devices, such as mobile telephones and electronic notebooks, are now in widespread use. These portable electronic devices enable consumers to enjoy high technology services, almost anytime and anywhere. The developing trend of these portable electronic devices is to be light, thin, short, and small in volume.

Among thin mobile phones, the bar-type mobile phone and the slidable mobile phone are very popular. A typical foldable mobile phone is relatively thicker than the bar-type and slidable mobile phones and is more complicated. Thus, it is difficult for the foldable mobile phone to have a thin volume.

Therefore, a new thin foldable electronic device is desired.

SUMMARY

In one aspect thereof, a foldable electronic device includes a cover having a side barrel and a main body rotatably connected to the cover. The main body includes a body shell accommodating a plurality of electronic components therein, a central barrel formed at one end of the body shell, and an antenna seat attached to an opposite end of the body shell. The side barrel of the cover is located adjacent to the central barrel of the main body.

In another aspect thereof, a foldable electronic device includes a cover and a main body rotatably connected to the cover. The cover includes a cover shell and a main portion slidable relative to the cover shell along a side extending direction.

Other advantages and novel features of the embodiments will become more apparent from the following detailed description thereof, when taken in conjunction with the accompanying drawings.

BRIEF DESCRIPTION OF THE DRAWINGS

Many aspects of the present foldable electronic device can be better understood with reference to the following drawings. The components in the drawings are not necessarily drawn to scale, the emphasis instead being placed upon clearly illustrating the principles of the present foldable electronic device. Moreover, in the drawings, like reference numerals designate corresponding parts throughout the several views, in which.

DETAILED DESCRIPTION OF THE EMBODIMENTS

Figure 1:
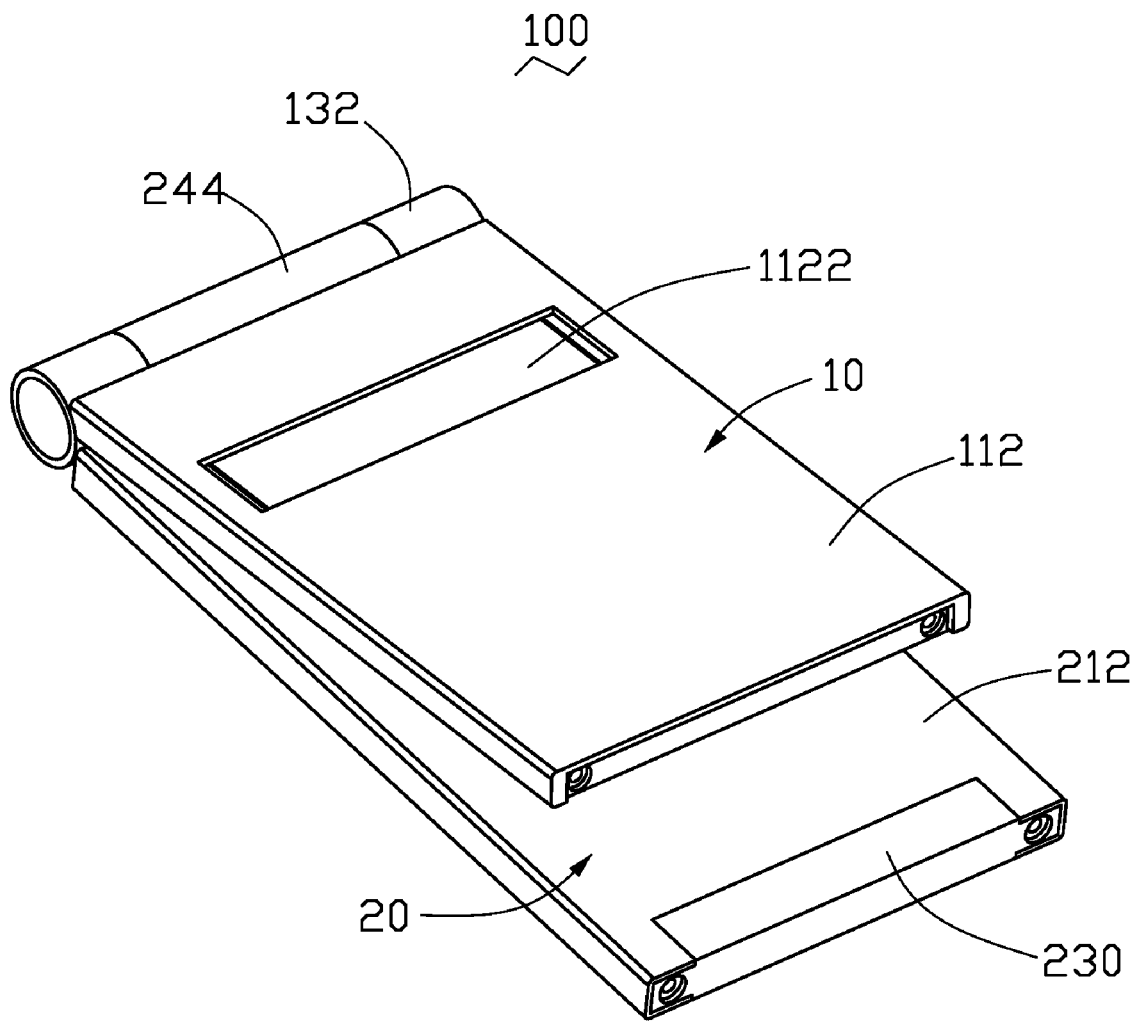
FIG. 1 is an assembled, isometric view of a foldable electronic device in a partially open state, in accordance with a present embodiment.
Figure 7:
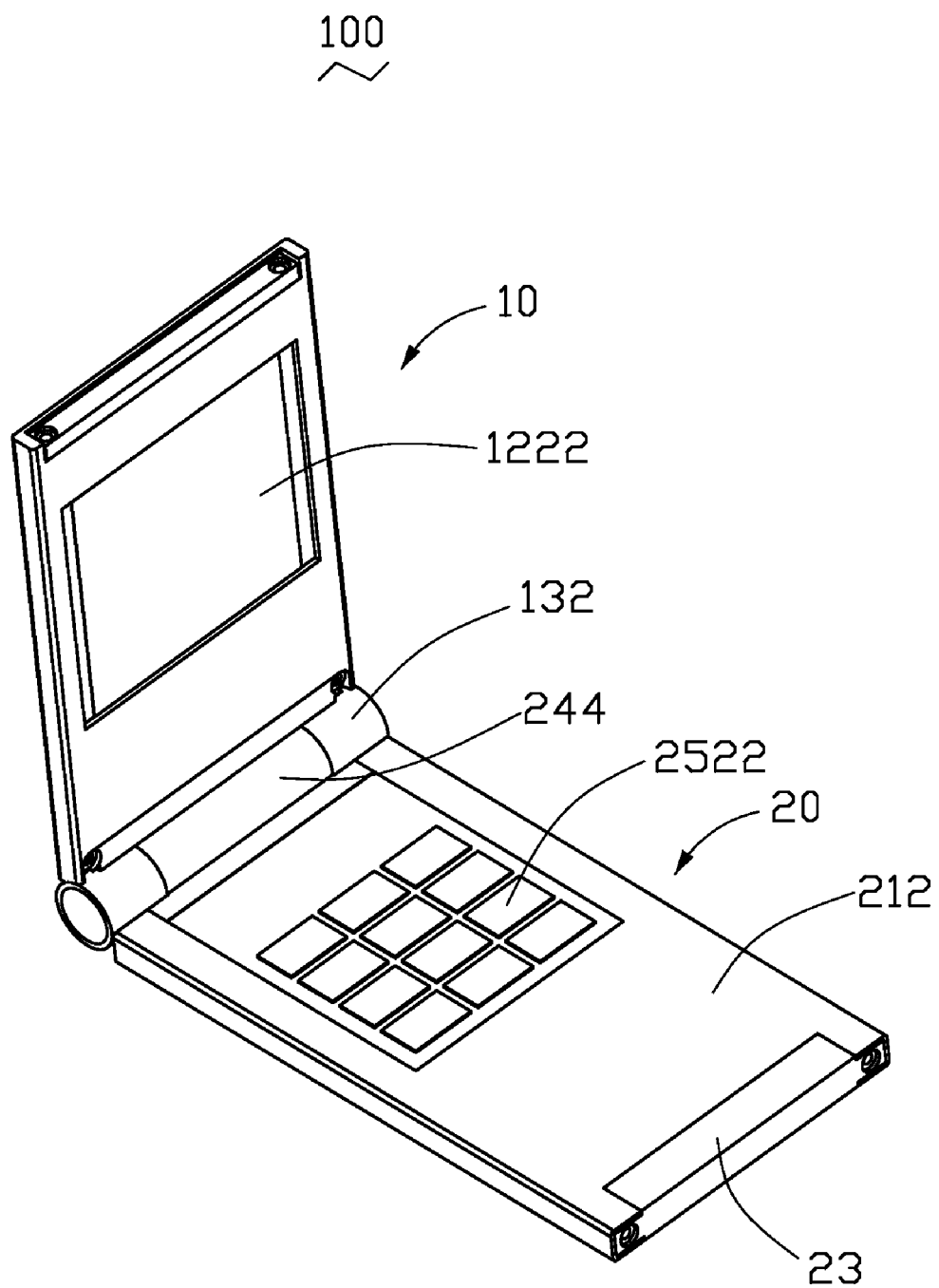
FIG. 7 is similar to FIG. 1 but showing the foldable electronic device in a fully open state.

Referring to the drawings in detail, FIGS. 1 and 7 show a foldable electronic device 100 according to a present embodiment. The foldable electronic device 100 includes a cover 10 and a main body 20 rotatably connected to the cover 10.

Figure 2:
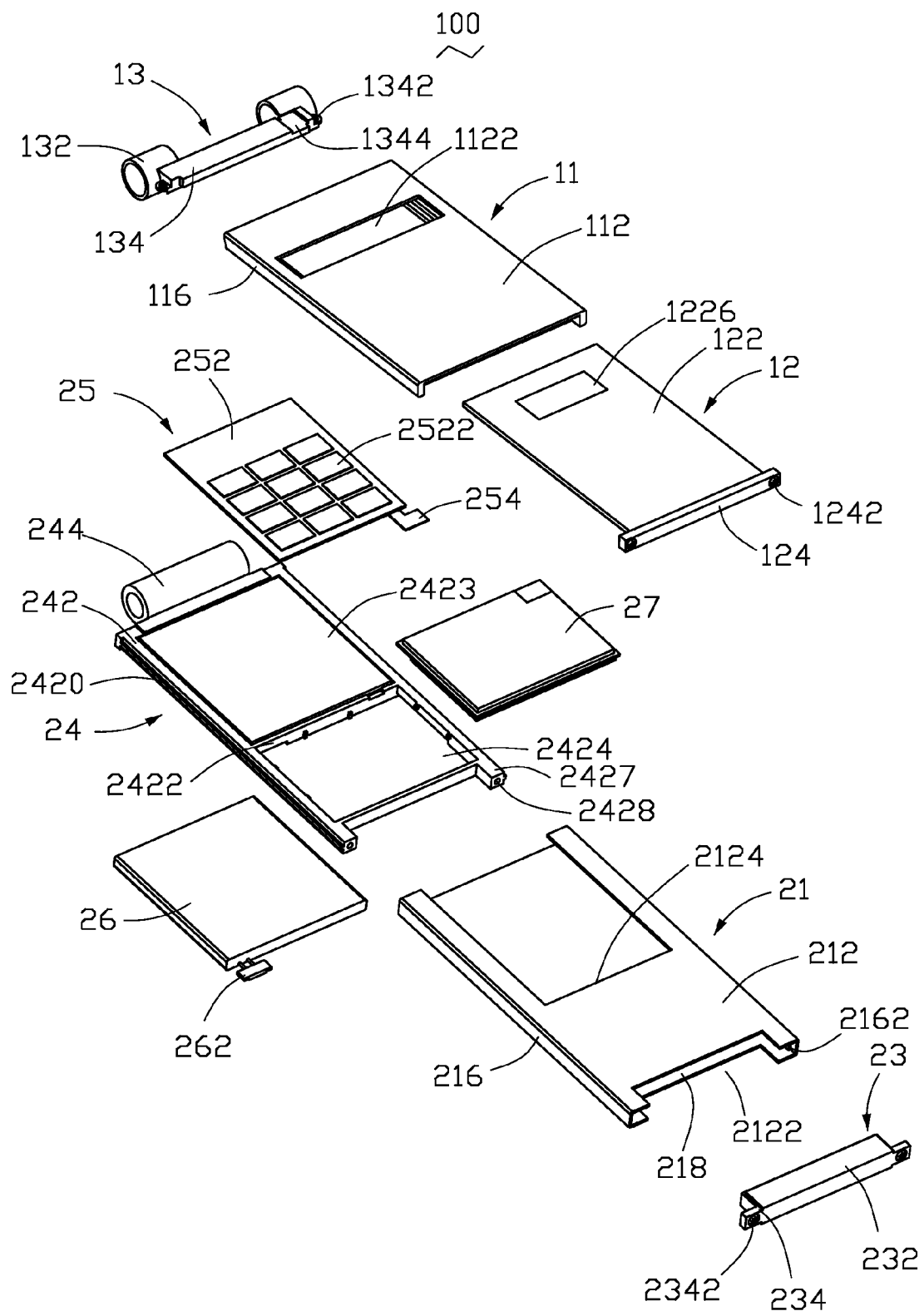
FIG. 2 is an explored, isometric view of the foldable electronic device shown in FIG. 1.
Figure 3:
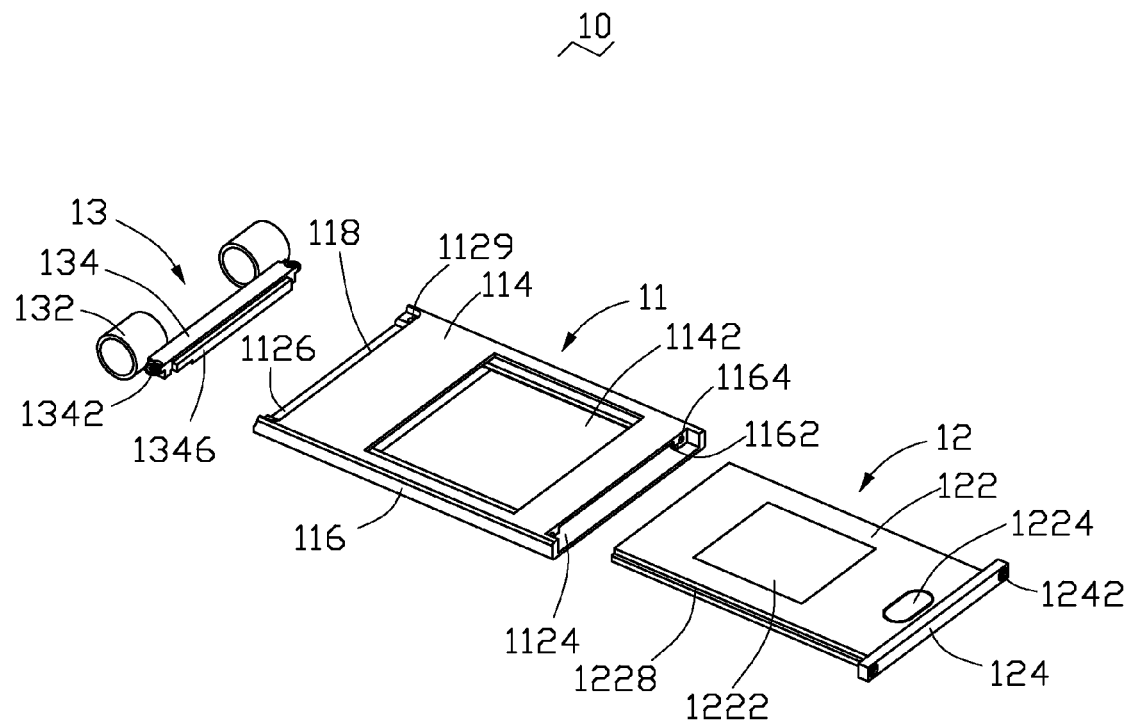
FIG. 3 is an explored, isometric of the cover of the foldable electronic device shown in FIG. 1.
Figure 5:
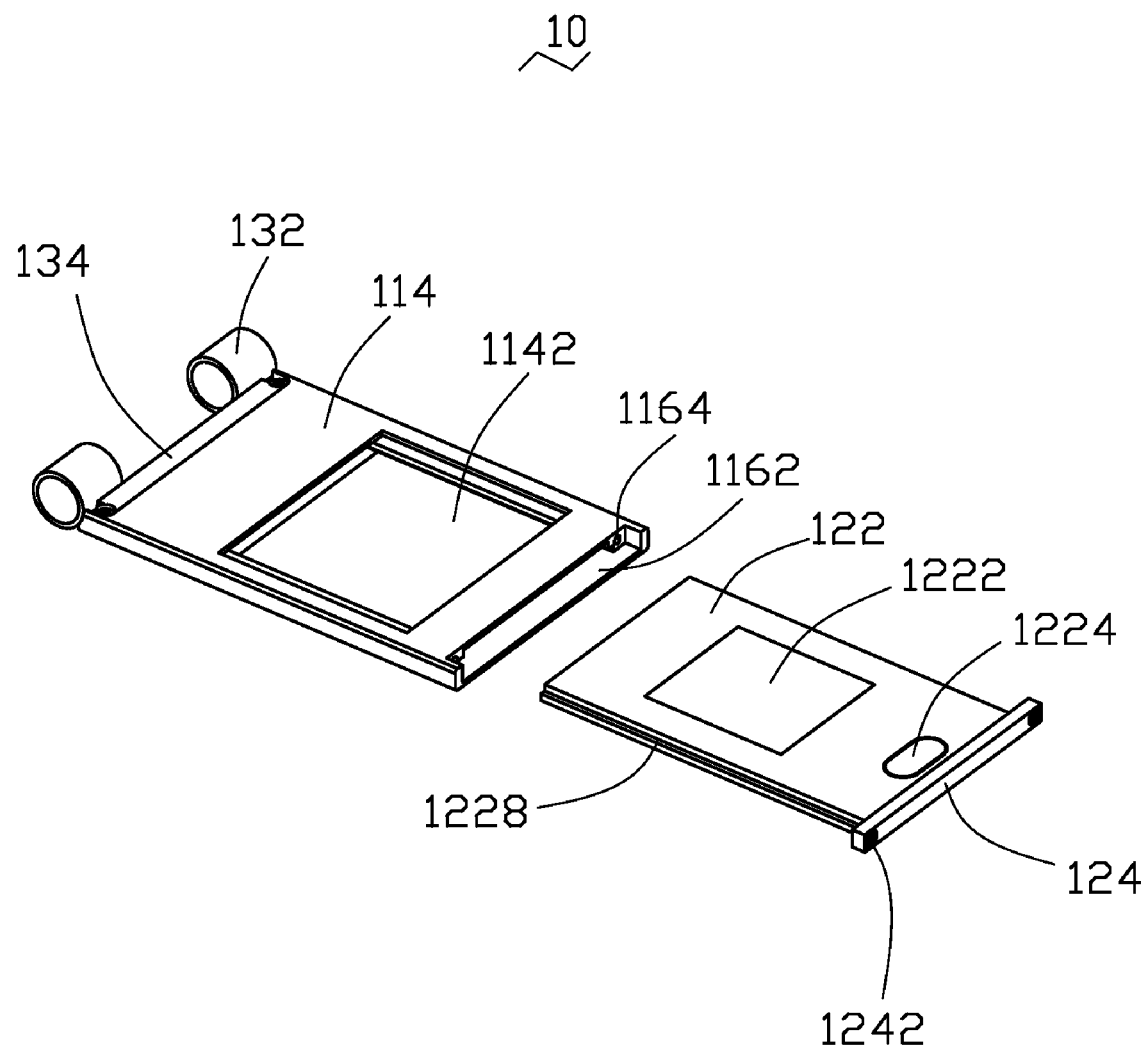
FIG. 5 is a partially assembled, isometric of the cover shown in FIG. 3.

Also referring to FIGS. 2, 3 and 5, the cover 10 includes a cover shell 11, a display module 12 contained in the cover shell 11, and a receiving member 13 fixed at one end of the cover shell 11. The cover shell 11 is a hollow cuboid and has a top board 112, a bottom board 114 parallel to the top board 112, two opposite sidewalls 116, which cooperate to define a cavity 118. The top board 112 defines a rectangular accessorial display hole 1122 in one end thereof. The bottom board 114 defines a main display hole 1142 in one end thereof. The cover shell 11 has a fixing cavity 1124 defined in a distal end and partially in the sidewalls 116, and a positioning cavity 1126 in an opposite distal end and partially in the sidewalls 116. Each sidewall 116 defines screw holes 1164, 1129 in two opposing ends thereof and a guiding groove 1162 in an extending direction thereof. The guiding grooves 1162 face to each other and communicate with the cavity 118.

The display module 12 includes a main portion 122 and a fixing portion 124 fixed at one distal end of the main portion 122. The main portion 122 has a main display 1222 formed at one surface thereof, an accessorial display 1226 and a receiver 1224 at an opposing surface thereof, and two guiding rails 1228 formed at two opposing sides thereof. The main portion 122 is configured for being slidable relative to the cover shell 11 along a long side direction by cooperation of the guiding grooves 1162 and the guiding rails 1228. The fixing portion 124 defines two screw holes 1242 in two opposing ends thereof. Each screw hole 1242 corresponds to screw hole 1164 thereby fixing the cover shell 11 and the display module 12 together by a bolt.

The receiving member 13 includes two side barrels 132 and a positioning portion 134. The positioning portion 134 has one side forming with the side barrels 132 and an opposing side forming with a block 1346. The positioning portion 134 has two screw holes 1342 defined in two opposing ends thereof corresponding to the screw holes 1129 thereby fixing the positioning portion 134 to the cover shell 11 by bolts.

Figure 6:
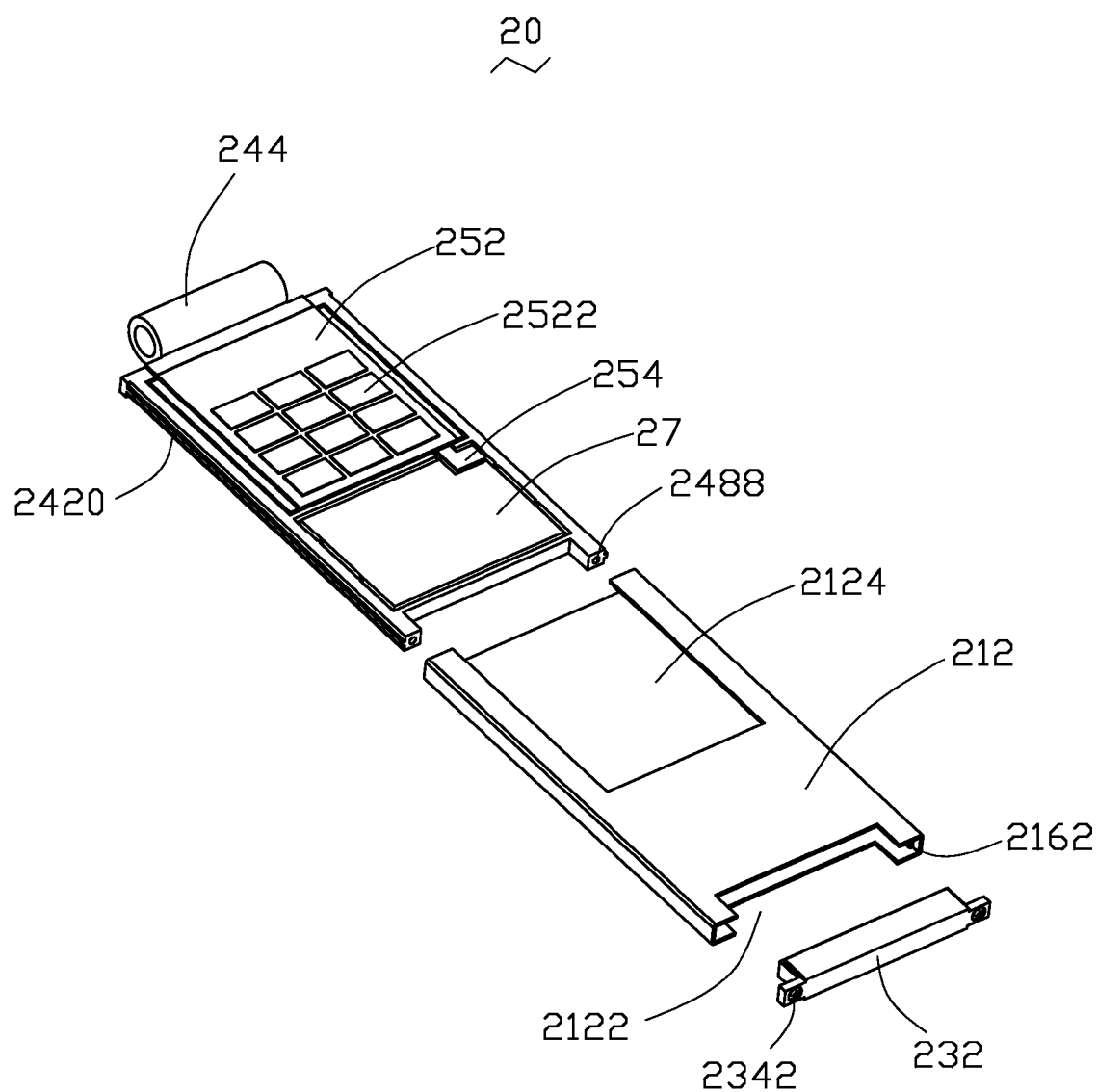
FIG. 6 is a partially assembled, isometric of the main body shown in FIG. 4.

Also referring to FIGS. 2, 3 and 6, the main body 20 includes a body shell 21, an antenna seat 23 attached to one end of the body shell 21, a holding module 24, a keypad module 25, a battery 26, and a printed circuit board (PCB) 27. The keypad module 25, the battery 26, and the PCB 27 are attached to the holding module 24 and are received in the body shell 21 with the holding module 24.

Figure 4:
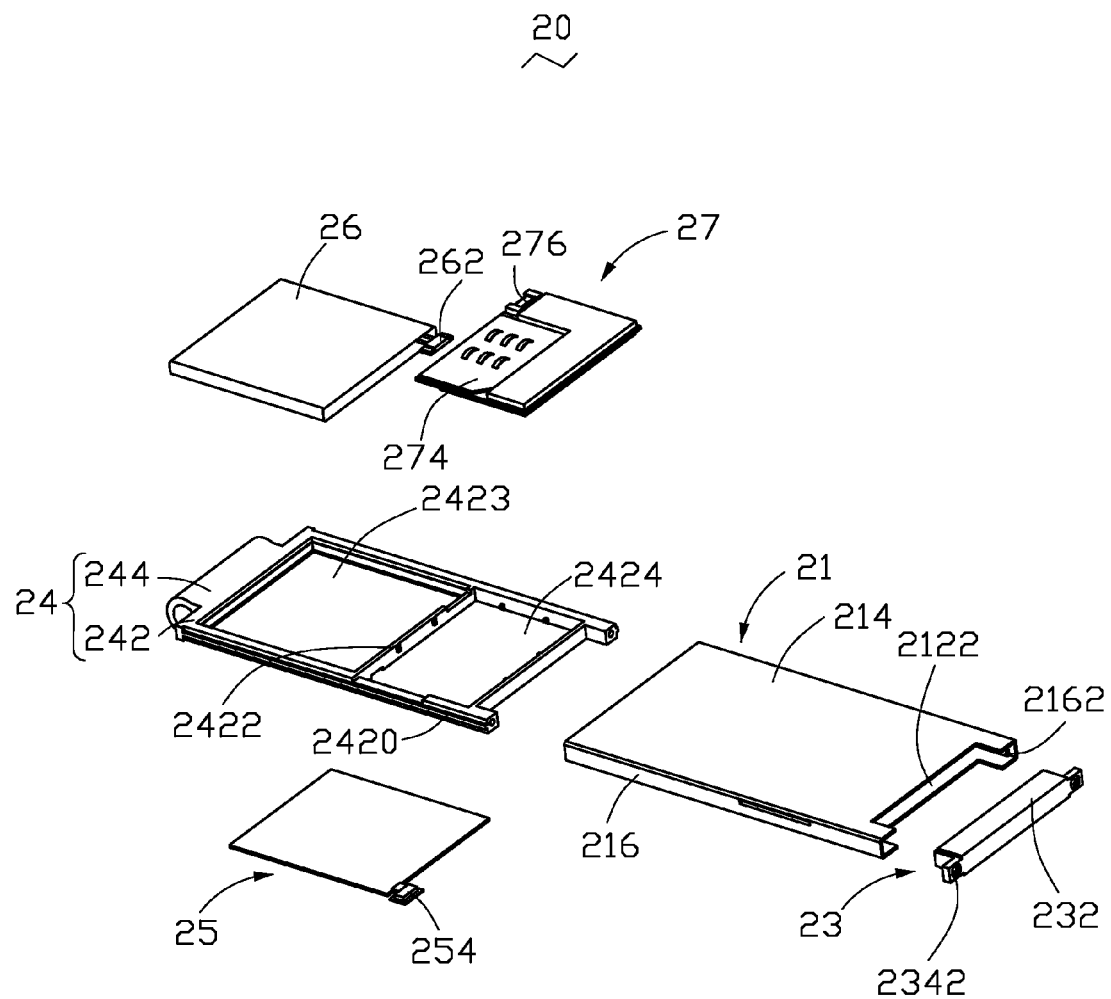
FIG. 4 is an explored, isometric of the main body of the foldable electronic device shown in FIG. 1.

Also referring to FIG. 4, the body shell 21 is a hollow cuboid and has a top board 212, a bottom board 214 parallel to the top board 212, two opposite sidewalls 216, and a cavity 218 defined in a center thereof. The body shell 21 defines a cutout 2122 in a distal end thereof and through the top board 212 and the bottom board 214. The top board 212 defines a keypad opening 2124 in an opposing end thereof. Each sidewall 216 defines a guiding groove 2162 in an extending direction thereof. The two guiding grooves 2162 face to each other and communicate with the cavity 218.

The antenna seat 23 includes a seat body 232 and two projections 234 extending from two opposing ends of the seat body 232. Each projection 234 defines a screw hole 2342 therein.

The holding module 24 includes a frame 242 and a central portion 244 formed at one end of the frame 242. The frame 242 has two guiding rails 2420 formed at two opposing sides thereof. The frame 242 is slidable relative to the body shell 21 along an extending direction thereof by the engagement of the guiding rails 2420 and the guiding grooves 2162. The frame 242 defines a receiving portion 2423 and a PCB hole 2424. A spacer 2422 is provided in-between the receiving portion 2423 and the PCB hole 2424. The receiving portion 2423 has an upper keypad recess in an upper surface and a lower battery recess in a lower surface. The upper keypad recess of the receiving portion 2423 is configured for receiving the keypad module 25 and the lower battery recess is configured for receiving the battery 26. The PCB hole 2424 is configured for receiving the PCB 27. Two projections 2427 extend in parallel away from the frame 242 and are substantially perpendicular to the spacer 2422. Each projection 2427 defines a screw hole 2428 therein.

The keypad module 25 includes a keypad portion 252 with a plurality of keys 2522 formed on the keypad portion 252 and a flexible circuit board 254 formed at a corner of the keypad portion 252. The flexible circuit board 254 is electrically connected to the PCB 27 for information transmission. The battery 26 has a contact 262 formed at one end thereof. The PCB 27 has a socket 276 and a subscriber identity module (SIM) card connector 274 formed side by side at one surface thereof. The socket 276 is electrically connected to the contact 262 of the battery 26 in order to supply power from the battery 26 to the PCB 27. The SIM card connector 274 is configured for electrically connecting to a SIM card.

Also referring to FIG. 7, after assembled, the main portion 122 of the display module 12 is received in the cavity 118 of the cover shell 11 and the fixing portion 124 of the display module 12 is received in the fixing cavity 1124 of the cover shell 11. The main display 1222 of the main portion 122 is exposed through the main display hole 1142 of the cover shell 11. The accessorial display 1226 of the main portion 122 is exposed through the accessorial display hole 1122 of the cover shell 11. The positioning portion 134 of the receiving member 13 is received in the positioning cavity 1126 of the cover shell 11 and the block 1346 of the receiving member 13 is received in the cavity 118.

The seat body 232 of the antenna seat 23 is received in the cutout 2122 of the body shell 21. The keypad portion 252 of the keypad module 25 is received in the keypad cavity of the receiving portion 2423, the battery is received in the battery cavity of the receiving portion 2423 of the holding module 24, and the PCB 27 is received in the PCB hole 2424 of the holding module 24. The keypad module 25 and the battery 26 are respectively electrically connected to the PCB 27. The assembled frame 24 with the keypad module 25, the battery 26, and the PCB 27 is received in the cavity 218 of the body shell 21. The antenna seat 23 is fixed to the frame 24 by fixing bolts in the screw holes 2342 of the antenna seat 23. The central barrel 244 of the frame 24 is located between the two side barrels 132 of the receiving member 13.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A foldable electronic device, comprising:
   a cover having a side barrel; and
   a main body rotatably connected to the cover, the main body including a hollow body shell with two open ends, an antenna seat and a frame accommodating a plurality of electronic components therein, a central barrel formed at one end of the frame, the frame slidably received in the body shell, the side barrel being located adjacent to the central barrel and one open end of the body shell; the antenna seat fastened to the frame from the other open end of the body shell.

2. The foldable electronic device as claimed in claim 1, wherein the frame has two guiding rails formed at two opposing sides thereof, the body shell defines two guiding grooves in two opposing sidewalls, and the frame is slidable relative to the body shell by the engagement of the guiding rails and the guiding grooves.

3. The foldable electronic device as claimed in claim 1, wherein the cover includes a hollow cover shell defining a fixing cavity at one end and a positioning cavity at another end, a display module including a main portion and a fixing portion, and a receiving member fastened to the cover shell in the positioning cavity; the side barrel is formed on the receiving member; the main portion is received in the cover shell, and the fixing portion is fastened to the cover shell in the fixing cavity.

4. The foldable electronic device as claimed in claim 3, wherein the cover shell has a top board and a bottom board parallel to the top board, the top board defines an accessorial display hole in one end thereof, and the bottom board defines a main display hole in one end thereof and the main display hole is distanced away from the accessorial display hole.

5. The foldable electronic device as claimed in claim 3, wherein the receiving member includes a positioning portion, and there are two side barrels formed at two opposing ends of the positioning portion.

6. The foldable electronic device as claimed in claim 3, wherein the display module has two guiding rails formed at two opposing sides thereof, the cover shell defines two guiding grooves in two opposing sidewalls, and the display module is slidable relative to the cover shell by the engagement of the guiding rails and the guiding grooves.

7. A foldable electronic device, comprising:
   a cover including a hollow cover shell, a display module and a receiving member; the cover shell defining a fixing cavity at one end and a positioning cavity at another end, the fixing cavity communicated to the positioning cavity; the receiving member fastened to the cover shell in the positioning cavity; the display module including a main portion and a fixing portion at one end of the main portion, the main portion inserted into the cover shell and the fixing portion fastened to the cover shell in the fixing cavity; and
   a main body rotatably connected to the receiving member of the cover.

8. The foldable electronic device as claimed in claim 7, wherein the main body includes a frame, the body shell is a hollow cuboid, and the frame is received in the body shell.

9. The foldable electronic device as claimed in claim 8, wherein the frame has two guiding rails formed at two opposing sides thereof, the body shell defines two guiding grooves in two opposing sidewalls, and the frame is slidable relative to the body shell by the engagement of the guiding rails and the guiding grooves.

10. The foldable electronic device as claimed in claim 8, wherein the cover includes two side barrels, the main body includes a central barrel formed at one end of the frame, the antenna seat is fastened to an opposite end of the body shell, and the central barrel is positioned between the two side barrels.

11. The foldable electronic device as claimed in claim 10, wherein the cover shell has a top board and a bottom board parallel to the top board, the top board defines an accessorial display hole in one end thereof, and the bottom board defines a main display hole in one end thereof and away from the accessorial display hole.

12. The foldable electronic device as claimed in claim 10, wherein the receiving member includes a positioning portion and the two side barrels are formed at two opposing ends of the positioning portion.

13. The foldable electronic device as claimed in claim 10, wherein the display module has two guiding rails formed at two opposing sides thereof, the cover shell defines two guiding grooves in two opposing sidewalls, and the display module is slidable relative to the cover shell by the engagement of the guiding rails and the guiding grooves.

14. A foldable electronic device, comprising:
a cover including a hollow cover shell and a display module, the display module including a main portion and a fixing portion at one end of the main portion, the fixing portion fastened to one end of the cover shell after the main portion is completely inserted into the cover shell; and
a main body rotatably connected to the cover, the main body including a hollow body shell with two open ends, an antenna seat and a frame, one end of the frame inserted into the body shell from one open end and disclosed from the other open end to be fastened with the antenna seat.

15. The foldable electronic device as claimed in claim 14, wherein the cover shell defines a fixing cavity at one end and a positioning cavity at another end, the fixing cavity is communicated to the positioning cavity; the cover further includes a receiving member fastened to the cover shell in the positioning cavity, and the fixing portion is fastened to the cover shell in the fixing cavity.

16. The foldable electronic device as claimed in claim 15, wherein the cover shell comprises two sidewalls, each sidewall defines a screw hole adjacent to the fixing cavity and another screw hole adjacent to the positioning cavity, the fixing portion and the receiving member define screw holes corresponding to that of the sidewalls.

17. The foldable electronic device as claimed in claim 3, wherein the frame defines two screw holes at one end, and the antenna seat defines two screw holes corresponding to that of the frame.

18. The foldable electronic device as claimed in claim 8, wherein the cover shell comprises two sidewalls, each sidewall defines a screw hole adjacent to the fixing cavity and another screw hole adjacent to the positioning cavity, the fixing portion and the receiving member define screw holes corresponding to that of the sidewalls.

19. The foldable electronic device as claimed in claim 7, wherein the cover shell comprises two sidewalls, each sidewall defines a screw hole adjacent to the fixing cavity and another screw hole adjacent to the positioning cavity, the fixing portion and the receiving member define screw holes corresponding to that of the sidewalls.

* * * * *